United States Patent [19]

Bailey

[11] Patent Number: 5,588,392

[45] Date of Patent: Dec. 31, 1996

[54] RESIN TRANSFER MOLDING PROCESS

[75] Inventor: Francis V. Bailey, Racine, Wis.

[73] Assignee: Outboard Marine Corporation

[21] Appl. No.: 423,783

[22] Filed: Apr. 18, 1995

[51] Int. Cl.⁶ ................................................. B63B 5/24
[52] U.S. Cl. ........................................ 114/357; 264/225
[58] Field of Search ........................... 114/357; 264/225, 264/257, 275, 277, DIG. 72, 510, 571

[56] References Cited

U.S. PATENT DOCUMENTS

| | | | |
|---|---|---|---|
| 2,495,640 | 1/1950 | Muskat | 154/110 |
| 2,541,297 | 2/1951 | Sampson et al. | 18/59 |
| 2,617,126 | 11/1952 | Nebesar | 114/357 |
| 2,903,389 | 9/1959 | Fujita | 154/110 |
| 2,913,036 | 11/1959 | Smith | 154/1.6 |
| 2,993,822 | 7/1961 | Reeves | 154/110 |
| 3,028,284 | 4/1962 | Reeves | 156/213 |
| 3,137,750 | 6/1964 | Gringras | 264/257 |
| 3,192,297 | 6/1965 | Gringras | 264/257 |
| 3,309,450 | 3/1967 | Rodgers | 264/257 |
| 3,368,293 | 2/1968 | Wiltshire | 18/5 |
| 3,410,936 | 11/1968 | Juras | 264/90 |
| 3,442,998 | 5/1969 | Wiltshire | 264/120 |
| 3,479,666 | 11/1969 | Webb | 2/3 |
| 3,675,294 | 7/1972 | Palfreyman et al. | 23/156.8 R |
| 3,711,581 | 1/1973 | Fowler, Jr. et al. | 264/45 |
| 3,761,560 | 9/1973 | Newlove | 264/257 |
| 3,773,581 | 11/1973 | Stanley | 156/71 |
| 3,934,064 | 1/1976 | Lowthian | 428/36 |
| 3,940,524 | 2/1976 | Hoppe et al. | 428/86 |
| 3,954,931 | 5/1976 | Helmuth et al. | 264/90 |
| 3,961,014 | 6/1976 | Pasch et al. | 264/297 |
| 3,962,394 | 6/1976 | Hall | 264/90 |
| 4,044,188 | 8/1977 | Segal | 428/283 |
| 4,062,917 | 12/1977 | Hill et al. | 264/102 |
| 4,069,290 | 1/1978 | Pasch | 264/297 |
| 4,088,525 | 5/1978 | Gowetski et al. | 156/173 |
| 4,099,280 | 7/1978 | Hoppe et al. | 114/357 |
| 4,120,632 | 10/1978 | Stoeberl | 425/405 R |
| 4,123,488 | 10/1978 | Lawson | 264/135 |
| 4,207,282 | 7/1980 | Grisch | 264/257 |
| 4,229,497 | 10/1980 | Piazza | 428/71 |
| 4,234,633 | 11/1980 | Gowetski et al. | 428/36 |
| 4,312,829 | 1/1982 | Fourcher | 264/571 |
| 4,353,964 | 10/1982 | Grimm et al. | 428/408 |
| 4,636,422 | 1/1987 | Harris et al. | 428/174 |
| 4,693,678 | 9/1987 | VonVolkli | 425/405 |
| 4,755,341 | 7/1988 | Reavely et al. | 264/313 |
| 4,762,740 | 8/1988 | Johnson et al. | 428/68 |
| 4,780,262 | 10/1988 | VonVolkli | 264/512 |
| 4,786,347 | 11/1988 | Angus | 156/172 |
| 4,824,631 | 4/1989 | Yeager | 264/552 |
| 4,902,215 | 2/1990 | Seemann, III | 425/406 |
| 4,910,067 | 3/1990 | O'Neill | 428/139 |
| 5,035,602 | 7/1991 | Johnson | 425/468 |
| 5,036,789 | 8/1991 | Kelly et al. | 114/357 |
| 5,045,251 | 9/1991 | Johnson | 264/40.1 |
| 5,052,906 | 10/1991 | Seemann | 425/112 |
| 5,059,377 | 10/1991 | Ashton et al. | 264/257 |
| 5,071,338 | 12/1991 | Dublinski et al. | 425/403 |
| 5,087,193 | 2/1992 | Herbert, Jr. | 425/543 |
| 5,106,568 | 4/1992 | Honka | 264/510 |
| 5,126,091 | 6/1992 | Melton | 264/257 |
| 5,131,834 | 7/1992 | Potter | 425/389 |
| 5,151,277 | 9/1992 | Bernardon et al. | 425/112 |

*Primary Examiner*—Jesus D. Sotelo
*Attorney, Agent, or Firm*—Michael, Best & Friedrich

[57] ABSTRACT

A method for manufacturing, in a resin transfer molding process, a fiber-reinforced polymer object having an exterior surface with first and second portions, the method comprising the steps of providing a first mold with an inner surface, placing dry reinforcement material on the first mold inner surface, providing a second mold including at least one flexible portion with an inner surface having the shape of the object first exterior surface portion, and the second mold also including at least one rigid portion with an inner surface having the shape of the object second exterior surface portion, placing the second mold over the dry reinforcement material to define a space between the first mold inner surface and the inner surfaces of the flexible and rigid portions, reducing the pressure, relative to ambient pressure, in the space between the molds, injecting resin into the space, and curing the resin.

21 Claims, 1 Drawing Sheet

U.S. PATENT DOCUMENTS

| | | | |
|---|---|---|---|
| 5,152,949 | 10/1992 | Leoni et al. | 264/257 |
| 5,183,619 | 2/1993 | Tolton | 264/257 |
| 5,204,033 | 4/1993 | Pearce et al. | 264/136 |
| 5,204,042 | 4/1993 | James et al. | 264/257 |
| 5,217,669 | 6/1993 | Dublinski et al. | 264/258 |
| 5,266,249 | 11/1993 | Grimes, III et al. | 264/45.2 |
| 5,286,438 | 2/1994 | Dublinski et al. | 264/220 |

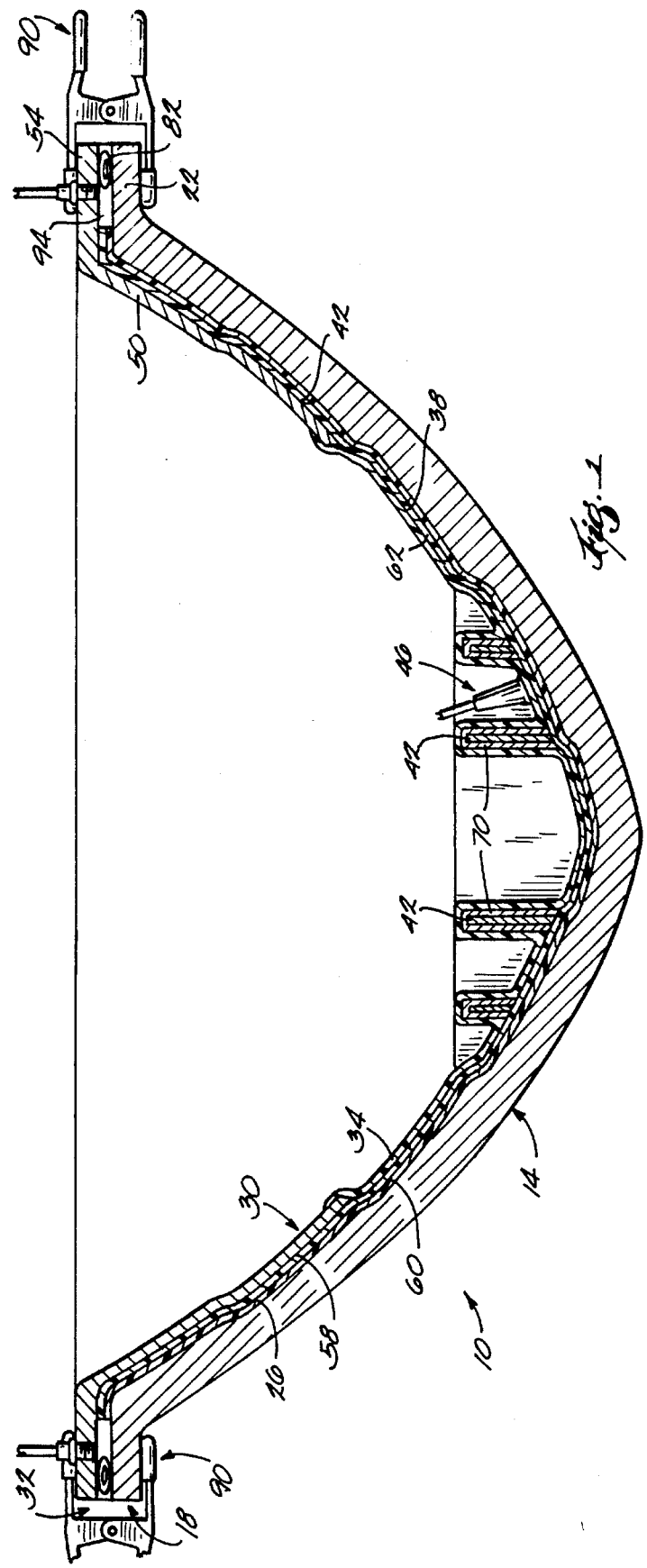

RESIN TRANSFER MOLDING PROCESS

BACKGROUND OF THE INVENTION

The invention relates to the resin transfer molding process. The invention also relates to the manufacturing of fiber-reinforced polymer or fiber-reinforced plastic boat hulls.

In resin transfer molding (RTM), dry reinforcement material is placed in a molding cavity defined by one or more mold surfaces, and liquid resin is then injected into the cavity to form the FRP product. See U.S. Pat. No. 4,762,740, which is incorporated herein by reference, for further explanation of conventional resin transfer molding. In one type of resin transfer molding, one of the mold halves is a flexible bag or sheet known as a vacuum bag.

U.S. patent application Ser. No. 08/220,110, which was filed Mar. 30, 1994 and which is assigned to the assignee hereof (Atty. Docket No. 72012/3030), discloses a process for manufacturing a boat hull with stringers by resin transfer molding. It is also known to manufacture a boat hull without stringers by resin transfer molding. See, for example, U.S. Pat. No. 4,902,215.

SUMMARY OF THE INVENTION

Vacuum bagging has the advantage of providing high glass to resin ratios to maximize strength while minimizing weight and resin cost as well as allowing molding of back drafts and similar features that cannot be molded with rigid tooling. A disadvantage of vacuum bagging is that the vacuum bagged surface conforms to the reinforcement material laid up against the rigid mold and as such usually has poor cosmetics and a rough, dimensionally unpredictable character.

The invention provides an improved method or process for resin transfer molding, particularly for molding an FRP boat hull. The invention applies mechanical reinforcement to a vacuum bag to overcome the drawbacks of vacuum bagging.

More particularly, the invention provides a method for manufacturing a fiber-reinforced polymer object in a resin transfer molding process. The method comprises the steps of (a) providing a first mold, (b) placing dry reinforcement material on the inner surface of the first mold, (c) providing a second mold including at least one flexible portion or vacuum bag and at least one rigid portion, (d) placing the second mold over the dry reinforcement material on the first mold, (e) reducing the pressure in the space between the molds, (f) injecting resin into the space, and (g) curing the resin.

The flexible portion or vacuum bag has an inner surface having the shape of part of the exterior surface of the object being molded. The vacuum bag is located where the advantages of vacuum bagging are desired. Thus, the vacuum bag is used to mold back drafts and similar features that cannot be molded with a rigid mold. The rigid portion has an inner surface having the shape of another part of the exterior surface of the object being molded. The rigid portion is located where it is desired to avoid the disadvantages of vacuum bagging, or where the advantages of rigid tooling are desired. Thus, the rigid portion is used for tight corners, dimensionally or cosmetically important areas, and the perimeter of the mold (to facilitate handling and prolong life). Any number of rigid and flexible portions can be employed. The inside of the rigid framework can be a highly polished mold surface which can be treated with gelcoat or other materials to provide an excellent cosmetic and dimensionally accurate surface.

Other features and advantages of the invention will become apparent to those skilled in the art upon review of the following detailed description, claims and drawings.

DESCRIPTION OF THE DRAWINGS

FIG. 1 is a sectional view of an apparatus embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 10 embodying the invention is illustrated in the drawings. Except as described below, the apparatus is substantially identical to the apparatus disclosed in above-mentioned U.S. patent application Ser. No. 08/220,110, which is incorporated herein by reference. While the preferred embodiment of the invention is an apparatus for manufacturing a boat hull, it should be understood that the invention applies to the manufacture of any object by resin transfer molding.

The apparatus 10 includes a first or female mold 14 having a periphery 18 and peripheral flange 22. The mold 14 has an inner surface 26 having the shape of the outer surface of the hull to be manufactured. The outer surface of the hull can also be considered an exterior surface of the hull.

The apparatus 10 also includes a second or male mold 30 having a periphery 32. The male mold 30 has an inner surface 42 (the lower surface in FIG. 1) having the shape of the inner surface of the hull to manufactured. The inner surface of the hull can also be considered an exterior surface of the hull.

The male mold 30 includes a flexible portion or vacuum bag 34 with an inner surface 38 having the shape of an inner portion of the hull inner surface. The hull inner surface portion formed by the vacuum bag 34 includes stringers 42 and other structural members that would be difficult to form with a rigid mold. The vacuum bag 34 can be made of any suitable material. The vacuum bag 34 includes injection ports 46.

The male mold 30 also includes a rigid portion 50 surrounding the flexible portion 34. The rigid portion 50 can be an FRP layup and/or include other materials such as, without limitation, wood, metal or plastic. The rigid portion 50 defines the periphery of the male mold 30 and includes a peripheral flange 54. The rigid portion 50 has an inner surface 58 having the shape of an outer portion of the hull inner surface. The rigid portion 50 can also include injection ports (not shown) if desired.

Preferably, the male mold 30 is manufactured by first manufacturing the rigid portion 50 and then "painting" the vacuum bag 34 onto the rigid portion 50 and an existing hull, in a manner similar to the manner in which the vacuum bag of above-mentioned U.S. patent application Ser. No. 08/220, 110 is made. As disclosed in U.S. patent application Ser. No. 08/220,110, the bag 34 is preferably made with clear silicone RTV caulking material. The silicone caulking material is thinned to a paintable consistency with a solvent such as naphtha, toluene or methylene hydrate. Roughly three parts naphtha to two parts silicone has been found to be a good mixture. Several coats (approximately eight) of the silicone mixture are painted onto the inner surface of the existing hull and overlapping onto the rigid portion 50, with the silicone being allowed to cure between coats. Next, a layer of reinforcing material, such as stretchable polyester fishnet fabric, is laid over the silicone, and then several more layers of silicone mixture are applied. The silicone has been found to adhere to the rigid portion 50 sufficiently so that nothing else is required to secure the vacuum bag 34 to the rigid portion 50. If desired, however, any suitable mechanism can be used to further secure the vacuum bag 34 to the rigid portion 50. The injection ports 46 can be either molded into the bag 34 while the bag is being formed or added to the bag 34 later.

To manufacture a boat hull in accordance with the invention, the female mold inner surface 26 is coated with a release agent, a gelcoat 60 and a skincoat (if desired). The release agent should be applied as needed. Next, dry reinforcement material 62 is placed in the female mold 14. The dry reinforcement material 62 can be various types of strand mat, woven roving, or a combination of these. Any other suitable dry reinforcement material can be employed. Next, any structural members, including the stringers 42, are placed on top of the dry reinforcement material 62. The stringers 42 are surrounded by additional dry reinforcement material 70, preferably glass mat.

The male mold 30 is then placed over or in the female mold 14 and over the stringers 42 and the dry reinforcement material 62 and 70, with the peripheral flange 54 of the male mold 30 overlapping the peripheral flange 22 of the female mold 14. A mold space or cavity containing the dry reinforcement material 62 and 70 and the stringers 42 is defined between the male mold 30 and the female mold 14.

As shown in the drawing, the peripheries of the molds 14 and 30 are sealed by an endless seal 82 located between the upper surface of the female mold flange 34 and the underside of the male mold flange 54. The flanges are held together by clamps 90 so that the seal 82 is compressed to define an airtight plenum or manifold 94 inside the seal 82 and between the flanges. The plenum 94 communicates with a vacuum pump (not shown) which creates a vacuum in the plenum 94 and thus in the mold space. In other words, the pump reduces the pressure, relative to ambient pressure, in the mold space. Alternatively, any suitable arrangement can be employed for reducing the pressure in the mold space relative to ambient pressure. Also, the apparatus 10 can be used in an autoclave process in which the pressure forcing the vacuum bag 34 against the female mold 14 can be higher than one atmosphere.

After a vacuum has been drawn in the mold space, resin is injected into the injection ports 46, preferably through one port at a time. Any suitable resin, such as an unsaturated polyester resin, can be employed. Unused ports 46 are clamped off. Because of the reduced pressure in the mold space, the resin does not have to be injected under significant pressure. An injection pressure of up to twenty-eight inches Hg is sufficient. If the injection ports 46 are properly located, resin will completely fill the mold space, saturating the dry reinforcement material 62. If necessary, hand-held rollers can be rolled over the vacuum bag 34 to promote resin flow throughout the mold space. The vacuum is maintained until the resin has cured. The male mold 30 is then removed from the female mold.

It should be understood that the male mold 30 could have any number of flexible portions, depending on need. Flexible portions can be used in any location where it would be difficult to employ a rigid mold. On the other hand, the male mold 30 should be rigid in areas such as tight corners, dimensionally or cosmetically important areas, and the perimeter of the mold.

Various features of the invention are set forth in the following claims.

I claim:

1. A method for manufacturing, in a resin transfer molding process, a fiber-reinforced polymer object having first and second exterior surface portions, the method comprising the steps of providing a first mold with an inner surface, placing dry reinforcement material on the first mold inner surface, providing a second mold including at least one flexible portion with an inner surface having the shape of the object first exterior surface portion, and the second mold also including at least one rigid portion with an inner surface having the shape of the object second exterior surface portion, placing the second mold over the dry reinforcement material to define a space between the first mold inner surface and the inner surfaces of the flexible and rigid portions, reducing the pressure, relative to ambient pressure, in the space between the molds, injecting resin into the space, and curing the resin.

2. A method as set forth in claim 1 wherein the second mold flexible portion includes a vacuum bag.

3. A method as set forth in claim 1 wherein the first and second molds have respective peripheries, and wherein the method further comprises the step of sealing the peripheries of the first and second molds prior to the reducing step.

4. A method as set forth in claim 3 wherein the first mold has a peripheral flange, wherein the second mold rigid portion has a peripheral flange, wherein the sealing step includes the step of forming a plenum between the peripheral flanges, and wherein the pressure reducing step includes the step of reducing the pressure in the plenum.

5. A method as set forth in claim 4 wherein the plenum forming step includes the step of providing an endless seal between the peripheral flanges such that the plenum is defined inside the seal.

6. A method as set forth in claim 1 wherein the rigid portion surrounds the flexible portion.

7. A method as set forth in claim 1 wherein second mold has a periphery, and wherein the rigid portion defines the periphery.

8. A method as set forth in claim 1 wherein the reducing step includes the step of drawing a vacuum in the space.

9. A method for manufacturing a boat hull having a outer surface and including fiber-reinforced polymer and a plurality of stringers embedded in the fiber-reinforced polymer so that the fiber-reinforced polymer and the stringers define an inner surface of the boat hull, the inner surface including an inner portion defined in part by the stringers and an outer portion surrounding the inner portion, the method comprising the steps of providing a female mold with a periphery and an inner surface having the shape of the hull outer surface, placing dry reinforcement material on the female mold inner surface, placing stringers on the dry reinforcement material, the stringers having additional dry reinforcement material thereon, providing a male mold with a periphery and an inner surface having the shape of the hull inner surface, the male mold including at least one flexible portion with an inner surface having the shape of the hull inner surface portion, and the male mold including at least one rigid portion which defines the male mold periphery and which has an inner surface having the shape of the hull outer surface portion, placing the male mold over the stringers and the dry reinforcement material to define a space between the male mold inner surface and the female mold inner surface, sealing the peripheries of the male mold and the female mold, reducing the pressure, relative to ambient pressure, in the space between the male mold and the female mold, injecting resin into the space, and curing the resin.

10. A method as set forth in claim 9 wherein the male mold flexible portion includes a vacuum bag.

11. A method as set forth in claim 9 wherein the female mold has a peripheral flange, wherein the male mold rigid portion has a peripheral flange, wherein the sealing step includes the step of forming a plenum between the peripheral flanges, and wherein the pressure reducing step includes the step of reducing the pressure in the plenum.

12. A method as set forth in claim 11 wherein the plenum forming step includes the step of providing an endless seal between the peripheral flanges such that the plenum is defined inside the seal.

13. A method as set forth in claim 9 wherein the rigid portion surrounds the flexible portion.

14. A method as set forth in claim 9 wherein the reducing step includes the step of drawing a vacuum in the space.

15. An apparatus for manufacturing, in a resin transfer molding process, a fiber-reinforced polymer object having an exterior surface with first and second portions, the apparatus comprising a first mold with an inner surface for supporting dry reinforcement material, and a second mold including at least one flexible portion with an inner surface having the shape of the object first exterior surface portion, and the second mold also including at least one rigid portion with an inner surface having the shape of the object second exterior surface portion, the second mold fitting over the first mold to define a space which is located between the first mold inner surface and the inner surfaces of the flexible and rigid portions and which contains dry reinforcement material on the first mold inner surface.

16. Apparatus as set forth in claim 15 wherein the second mold flexible portion includes a vacuum bag.

17. Apparatus as set forth in claim 15 wherein the first and second molds have respective peripheries which can be sealed to each other.

18. Apparatus as set forth in claim 17 wherein the first mold has a peripheral flange, and wherein the second mold rigid portion has a peripheral flange which can be sealed to the first mold flange to form a plenum between the peripheral flanges.

19. Apparatus as set forth in claim 18 and further comprising an endless seal between the peripheral flanges such that the plenum is defined inside the seal.

20. Apparatus as set forth in claim 15 wherein the rigid portion surrounds the flexible portion.

21. Apparatus as set forth in claim 15 wherein second mold has a periphery, and wherein the rigid portion defines the periphery.

* * * * *